(12) United States Patent
Chauvin et al.

(10) Patent No.: US 9,963,254 B2
(45) Date of Patent: May 8, 2018

(54) ROTARY SYSTEM FOR SIMULTANEOUSLY BLOWING AND FILLING PLASTIC CONTAINERS

(75) Inventors: Guillaume Chauvin, Singapore (SG); Damien Kannengiesser, Golbey (FR)

(73) Assignee: DISCMA AG, Hunenberg (CH)

( * ) Notice: Subject to any disclaimer, the term of this patent is extended or adjusted under 35 U.S.C. 154(b) by 690 days.

(21) Appl. No.: 14/236,830

(22) PCT Filed: Aug. 2, 2012

(86) PCT No.: PCT/EP2012/065117
§ 371 (c)(1),
(2), (4) Date: Feb. 3, 2014

(87) PCT Pub. No.: WO2013/020885
PCT Pub. Date: Feb. 14, 2013

(65) Prior Publication Data
US 2014/0157734 A1    Jun. 12, 2014

(30) Foreign Application Priority Data
Aug. 8, 2011    (EP) .................................... 11176858

(51) Int. Cl.
| | | |
|---|---|---|
| *B65B 3/02* | (2006.01) | |
| *B29C 49/46* | (2006.01) | |
| *B67C 3/22* | (2006.01) | |
| *B29C 49/06* | (2006.01) | |
| *B29C 49/12* | (2006.01) | |

(Continued)

(52) U.S. Cl.
CPC .............. *B65B 3/022* (2013.01); *B29C 49/46* (2013.01); *B67C 3/225* (2013.01); *B29C 49/06* (2013.01); *B29C 49/12* (2013.01); *B29C 49/36* (2013.01); *B29C 2049/4664* (2013.01); *B65B 3/26* (2013.01); *B67C 2003/227* (2013.01)

(58) Field of Classification Search
CPC ... B67C 3/225; B67C 2003/227; B65B 3/022; B65B 3/26; B29C 2049/465; B29C 2049/4652; B29C 2049/4655; B29C 2049/4664; B29C 49/12; B29C 49/36; B29C 49/46
USPC ......... 53/574, 578, 558, 559, 561, 272, 282; 141/164, 244; 264/524; 425/524
See application file for complete search history.

(56) References Cited

U.S. PATENT DOCUMENTS 2,428,598 A * 10/1947 Weaver ...................... B67C 3/16
                                                        141/150
2,727,666 A * 12/1955 Bryceland .................. H01J 9/38
                                                        141/151

(Continued)

FOREIGN PATENT DOCUMENTS

| CA | 2460670 A1 * | 9/2003 | ............. B29C 49/46 |
| DE | 1923690 A1 * | 11/1970 | ............. B65B 3/022 |

(Continued)

*Primary Examiner* — Stephen F Gerrity
(74) *Attorney, Agent, or Firm* — Eric J. Sosenko; Jonathan P. O'Brien; Honigman Miller Schwartz and Cohn LLP (57) ABSTRACT

A system and method to produce containers filled with liquid. A thermoplastic material preform is first subjected to thermal conditioning in the area of a heating section along a transport path. The preform is then shaped into the container inside a mold by applying pressure. The liquid with which the container is to be filled is used as the fluid for forming the container.

15 Claims, 3 Drawing Sheets

(51) Int. Cl.
  *B29C 49/36* (2006.01)
  *B65B 3/26* (2006.01)

(56) References Cited

U.S. PATENT DOCUMENTS

| | | | | |
|---|---|---|---|---|
| 3,138,178 | A * | 6/1964 | McK. Martin | B65B 55/14 141/146 |
| 3,267,185 | A * | 8/1966 | Freeman, Jr. | B29C 49/36 264/525 |
| 3,334,379 | A * | 8/1967 | Di Settembrini | B29C 49/36 425/451 |
| 3,345,686 | A * | 10/1967 | Di Settembrini | B29C 49/36 264/543 |
| 3,595,478 | A * | 7/1971 | Power | B05B 17/08 239/20 |
| 4,141,680 | A * | 2/1979 | Kauffman et al. | B29C 49/36 425/526 |
| 4,167,203 | A * | 9/1979 | Tschersich et al. | B65B 3/26 141/152 |
| 4,387,747 | A * | 6/1983 | Franek et al. | B67C 3/24 141/1 |
| 4,456,040 | A * | 6/1984 | Bacroix et al. | B67C 3/02 141/150 |
| 4,650,412 | A * | 3/1987 | Windstrup et al. | B29C 49/36 264/543 |
| 4,707,966 | A | 11/1987 | Weiler | |
| 7,182,110 | B2 * | 2/2007 | Roebuck | B65B 3/36 141/244 |
| 7,473,388 | B2 * | 1/2009 | Desanaux et al. | B65B 3/022 264/524 |
| 7,942,170 | B2 * | 5/2011 | Gruson | B67C 3/001 141/237 |
| 8,721,315 | B2 * | 5/2014 | Maki et al. | B65B 3/022 425/215 |
| 8,828,290 | B2 * | 9/2014 | Voth et al. | B29C 49/42 264/39 |
| 2005/0150191 | A1 * | 7/2005 | Taylor | B65B 3/34 53/471 |
| 2010/0090375 | A1 * | 4/2010 | Geltinger et al. | B29C 49/783 264/529 |
| 2010/0303946 | A1 * | 12/2010 | Voth | B29C 49/42 425/226 |
| 2011/0089614 | A1 * | 4/2011 | Hirdina | B29C 49/18 264/529 |
| 2011/0268855 | A1 * | 11/2011 | Chauvin et al. | B29C 49/46 426/407 |
| 2011/0285063 | A1 * | 11/2011 | Chauvin et al. | B29C 49/46 264/525 |
| 2011/0309557 | A1 * | 12/2011 | Martini et al. | B29C 49/42 264/523 |

FOREIGN PATENT DOCUMENTS

| | | | | |
|---|---|---|---|---|
| DE | 102008032635 A1 * | 1/2010 | | B29C 49/46 |
| EP | 2269803 A2 | 1/2011 | | |
| WO | WO 2005092594 A1 * | 10/2005 | | B29C 2049/4655 |
| WO | 2011/076167 A1 | 6/2011 | | |

* cited by examiner

ROTARY SYSTEM FOR SIMULTANEOUSLY BLOWING AND FILLING PLASTIC CONTAINERS

CROSS REFERENCE TO RELATED APPLICATIONS

The present application is a National Stage of International Application No. PCT/EP2012/065117, filed on Aug. 2, 2012, which claims priority to European Patent Application No. 11176858.6, filed Aug. 8, 2011, the entire contents of which are being incorporated herein by reference.

FIELD OF THE INVENTION

The invention relates to a system for simultaneously blowing and filling plastic containers from preforms.

BACKGROUND

Plastic containers such as bottles of water are manufactured and filled according to different methods including blow moulding or stretch-blow moulding.

According to one of these known methods a plastic preform is first as, manufactured through a melding process and then heated before being positioned inside a blowing mould.

The preform usually takes the form of a cylindrical tube closed at its bottom end and open at its opposite end.

Once the preform has been positioned within the mould only the open end of the preform is visible from above the mould.

This method makes use of a stretch rod which is downwardly engaged into the open end of the preform so as to abut against the closed bottom end thereof. The stretch rod is further actuated to be urged against the closed end, thereby resulting in stretching the preform.

After the stretching phase has been initiated a liquid is also injected into the preform through its open end as disclosed for instance in Applicant's patent EP 1 529 620 B1. This liquid injection causes expansion of the preform until coming into contact with the inner walls of the mould, thereby achieving the final shape of the bottle.

Up to now a known machine or system for simultaneously blowing and filling plastic containers is vertically oriented and manufactures one container at a time.

Each machine or system comprises a mould enclosing a preform, stretching means for stretching the preform within the mould and injection means for injecting a liquid under pressure into the preform so as to cause expansion of said preform within the mould.

However, the throughput of such a machine operating according to the above manufacturing process is limited.

There is therefore a need to have a system for manufacturing and filling containers with a high throughput.

SUMMARY OF THE INVENTION

In this respect, a rotating apparatus is thus equipped with a plurality of rotating stations that are operable to blow and fill a plurality of containers at the same time, whereas the prior art machine only blows and fills a container at a time.

Each rotating station in the invention includes a mould, stretching means and injection means.

It is to be noted that the prior art machine uses a rather heavy mould and involves a manufacturing process in which a container is simultaneously blown through using a movable stretch rod and filled with a liquid supplied from outside.

Taking account of the above this seems quite natural for the person skilled in the art to keep such a machine in a fixed position, notably due to the weight of the mould and the supply of liquid to be injected.

In view of these technical difficulties, the conception of a rotating apparatus with a plurality of rotating blowing and filling stations connected to a common rotary manifold for distributing liquid to the stations is therefore the result of an inventive step.

The system according to the invention dramatically increases the throughput of a conventional apparatus or machine as briefly described above.

The apparatus rotates with masses of liquid in motion which are distributed to the different injection means. Surprisingly, injecting a liquid during the rotation of the apparatus does not raise any mechanical or fluidic problem contrary to what could be expected by the person skilled in the art.

According to a possible feature, the pump device is part of the rotating apparatus and in a particular embodiment, of the rotating manifold.

Thus, every component of the system for simultaneously blowing and filling plastic containers rotates.

According to another possible alternative feature, the pump device is in a fixed position while the apparatus including the moulds, stretching means, injection means and manifold rotates.

This arrangement makes it possible to alleviate the weight of the rotating part of the system and therefore, render its structure more simple.

Arranging the pump device outside the rotating part of the system also makes possible to simplify the rotary electrical union between the fixed and moving parts, in particular, this rotary electrical union does not need any dedicated power supply cable for the pump device.

Such a rotary electrical union is nevertheless needed to supply power to different pieces of equipment such as solenoid valves, etc.

According to a possible feature, the plurality of moulds are spatially arranged around the periphery of the manifold.

This arrangement is particularly simple and makes it possible to easily distribute pressurized liquid radially to the periphery of the manifold, which corresponds to the natural movement of a fluid in a rotating device.

According to another possible feature, the manifold is rotatable about a central vertical axis, each mould having an upper portion that is provided with an aperture, each preform having a mouth that is arranged within said aperture when enclosed within said mould, said aperture being centered around a longitudinal axis that is inclined towards said central vertical axis.

This arrangement makes it possible to avoid over-spilling of the liquid contained in each rotating preform after it has been injected thereinto.

This inclination takes into account the natural movement of a liquid in a rotating device and which is pushed radially outwardly under the action of centrifugal forces. Thus, contrary to what could be expected by the person skilled in the art, injection of liquid into preforms during their rotation does not lead to splashing of the liquid all around the preforms thanks to the above arrangement.

It is to be noted that each of the plurality of moulds, stretching means and injection means is inclined toward said central vertical axis around the periphery of the manifold.

According to a possible more specific feature, said inclined longitudinal axis is at an angle relative to a vertical axis that is greater than 0 and less than 90°.

An appropriate angle of inclination is adjusted taking account notably of the speed of rotation of the apparatus.

According to a possible feature, the manifold surrounds a central zone, the pump device being located in said central zone.

This arrangement makes it possible to accommodate the pump device in said central zone and to render the apparatus more compact.

It is to be noted that the pump device may be partially located within the central zone of the manifold and partially located above or below the manifold according to the desired position.

According to a possible arrangement, the manifold has an annular shape. The cross section may assume different shapes: square, rectangular, circular, etc. . . . .

This shape makes it possible to accommodate at least part of the pump device in the middle thereof as well as other parts, pieces of equipments, fittings, fluidic and electrical connections (cables, rotary unions, etc.), etc.

Furthermore, an annular shape is of reduced weight compared to a solid shape, which is advantageous in a rotating apparatus.

The manifold may be annular in shape and assume the shape of a portion of a cylinder of small height compared to its external radius, the middle portion of which has been removed.

More particularly, the manifold may have a toroidal shape. Such a shape proves to be relatively easy to clean inside.

According to another possible feature, the manifold has a cylindrical shape.

The manifold may therefore assume the shape of a cylinder of small height compared to its external radius.

According to a possible feature, the pump device is located above or below the manifold.

One of these arrangements may be selected according to the configuration of the system, and in particular, of the other components thereof.

Also, the above or below location of the pump device with respect to the manifold may be selected according to the environment of the system and the space available around the system as well as the arrangement of the other pieces of equipment of the system and the space available around each of them.

Put it another way, the position of the pump device is merely chosen depending on space management criteria.

According to a possible feature, each injection means has a proportional valve to control the volume of liquid injected into the corresponding preform.

Such a proportional valve which is an optional feature in the system according to the invention may be desired in certain circumstances to control the volume of injected liquid.

It is to be noted that a flow meter may be associated to a proportional valve for providing the flow rate of the liquid and/or the volume of liquid injected in each preform.

Furthermore, the knowledge of the overall volume of liquid injected through a given valve or all the valves of the system may be useful.

According to one possible feature, the plurality of mould represent a whole blowing and filling cycle. Thus, in the course of rotation of the apparatus each mould enclosing a preform is submitted to a whole blowing and filling cycle, in particular including blowing and filling with a liquid through the use of stretching means and injection means.

It is to be noted that the blowing and filling cycle may also include a capping process or phase during which a cap is fixed on a container once the latter has been blown and filled by the liquid.

In this respect, the system may include capping means.

According to another possible feature, the system has a capacity of simultaneously blowing and filling a number of plastic containers up to 72,000 per hour.

It is to be noted that the rotating apparatus of the system keeps rotating so that a blowing and filling cycle of a container is not interrupted.

BRIEF DESCRIPTION OF DRAWINGS

Embodiments of the present invention will now be described, by way of example only, with reference to the accompanying figures, in which.

DESCRIPTION OF THE PREFERRED EMBODIMENT

Figure 1:
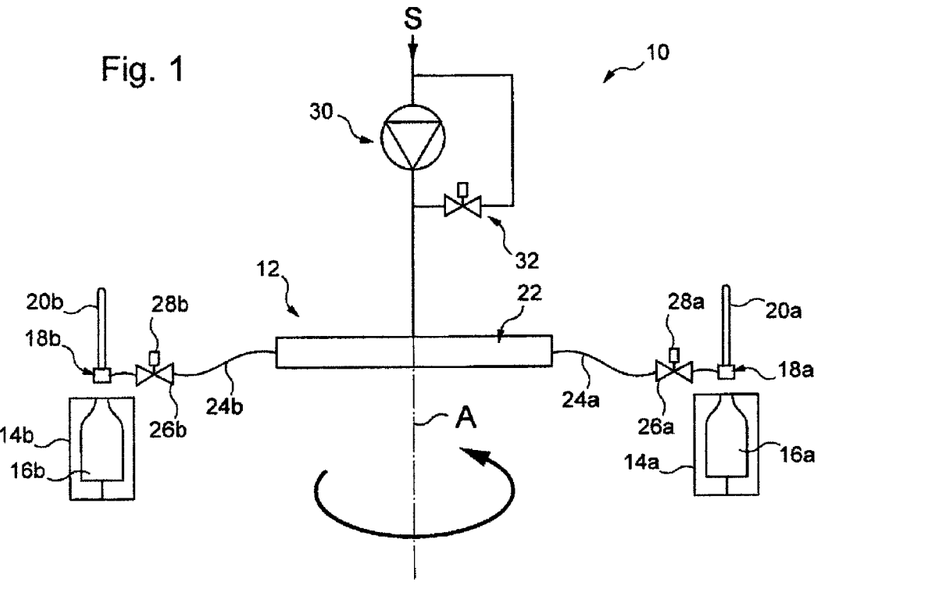
FIG. 1 is a schematic side view illustrating a system for simultaneously blowing and filling containers according to the invention and its main components.

FIG. 1 schematically represents a system 10 for simultaneously blowing and filling plastic containers, such as bottles, from plastic preforms.

System 10 comprises an apparatus 12 that is capable of rotating around a central vertical axis A as indicated by the arrow.

Rotating apparatus 12 includes a plurality of moulds 14a, 14b, . . . , 14n two of which only, 14a and 14b, being illustrated in FIG. 1.

Each mould is a two-part mould which forms an inner cavity 16a, 16b when assembled together.

A preform that is not represented in FIG. 1 is inserted into each cavity at the beginning of the blowing and filling process.

The shape of the cavity corresponds to the shape of the achieved container and it will be wholly occupied by the plastic container at the end of the blowing and filling process.

In the present embodiment the container is a bottle which is filled with water.

However, other containers may be envisaged as well as other liquids.

It is also to be noted that each mould may be alternatively composed of more than two parts depending on the manufacturing process.

Apparatus 12 further includes a plurality of injection means 18a, 18b . . . , 18n two of which only, 18a and 18b, being illustrated in FIG. 1.

These injection means comprise each an injection head which comes into a sealing contact (fluid tightness) with a preform which has been enclosed within a mould.

The injection head includes an injection nozzle that is movable between an injection position allowing liquid to be injected into the preform and a rest position in which the injection nozzle rests against an inner surface of the injection head in a sealing engagement so as to prevent any flow of liquid from the injection head to the preform.

Apparatus 12 also includes stretching means 20a, 20b, . . . , 20n, only two of them, 20a and 20b, being illustrated in FIG. 1.

Each stretching means comprises a stretching rod which is in a sliding connection with the corresponding injection nozzle. Each stretching means is actuated upon command to be inserted into a preform so as to stretch it while a liquid is injected into the preform so as to cause expansion of said preform within the corresponding mould.

Actuation means for actuating the rods of the stretching means have not been represented in the drawings for the sake of clarity.

Apparatus 12 further includes a liquid distributing unit or manifold 22 which is centrally located in the system with respect to the plurality of moulds, injection means, and stretching means.

For instance, vertical axis A is a symmetry axis to manifold 22.

Manifold 22 is operable to distribute a liquid under pressure to the plurality of injection means 18a, 18b, . . . , 18n such that the preforms enclosed within the moulds are simultaneously blown and filled by said liquid together with the action of the stretching means.

As represented in FIG. 1, each injection means 18a, 18b (and more generally all the injection means up to 18n) is connected to an outlet to rotating manifold 22 through a fluid line or pipe 24a and 24b respectively. The plurality of fluid lines (fluidic connections) 24a, b, . . . n are radially arranged as illustrated in FIG. 2B embodiment.

For example, manifold 22 comprises one or several liquid inputs and, internally, is empty so as to make its cleaning easier. Manifold 22 further comprises several outlets that are connected to the corresponding fluid lines or pipes respectively.

A flow valve 26a and 28b is respectively mounted on the corresponding fluid line so as to control the flow of liquid between manifold 22 and injection means 28a and b respectively.

This flow valve is for instance a proportional valve.

Such a valve allows the flow of liquid to be accurately controlled and therefore, the liquid filling curve (when filling the container together with its blowing) to be adjusted so as to correspond to a given curve.

Optionally, a corresponding flow meter 28a, 28b, . . . , 28n is respectively associated with the corresponding valve 26a, 26b, . . . 26n so as to measure a flow rate or volume of flowing liquid between manifold 22 and the corresponding injection means.

The whole connection between each injection means and the manifold rotates together with these components.

Liquid to be distributed and injected is supplied from a source of liquid S which feeds said liquid to a pump device 30.

Pump device 30 therefore supplies pressurized liquid to rotating manifold 22.

In the present embodiment, pump device 30 is also part of the rotating apparatus 12.

More particularly, pump device 30 is operatively connected to manifold 22 in a conventional manner.

It is to be noted that a flow valve 32 is mounted in parallel to pump device 30 as a safety valve.

This valve acts as a discharge valve in order to protect the pump device, for instance when the pressure is building up or if there is no fluid flow to supply when no bottle is being manufactured).

Pump device 30 may be centrally located, e.g. in a position that is aligned with vertical axis A.

Such an arrangement makes it possible to provide whole system 10 with a more compact design. This arrangement is also easier to conceive since the pump device is centered around the rotating axis of the system.

However, other arrangements of the system may be envisaged, in particular with a pump device laterally offset with respect rotating axis A.

As represented in FIG. 1, pump device 30 is located above manifold 22.

However, in a alternative arrangement, pump device may be located under manifold 22.

In the present embodiment manifold 22 is cylindrical in shape.

However, other shapes may be alternatively envisaged for distributing liquid to the injection means of the system.

It is to be noted that the different rotating parts of the system may be supported by a common rotating plate.

It will be appreciated that each mould enclosing a preform and its corresponding injection means and stretching means forms a station and all these stations are spatially arranged around the manifold as schematically represented in FIG. 2B.

Figure 2A:
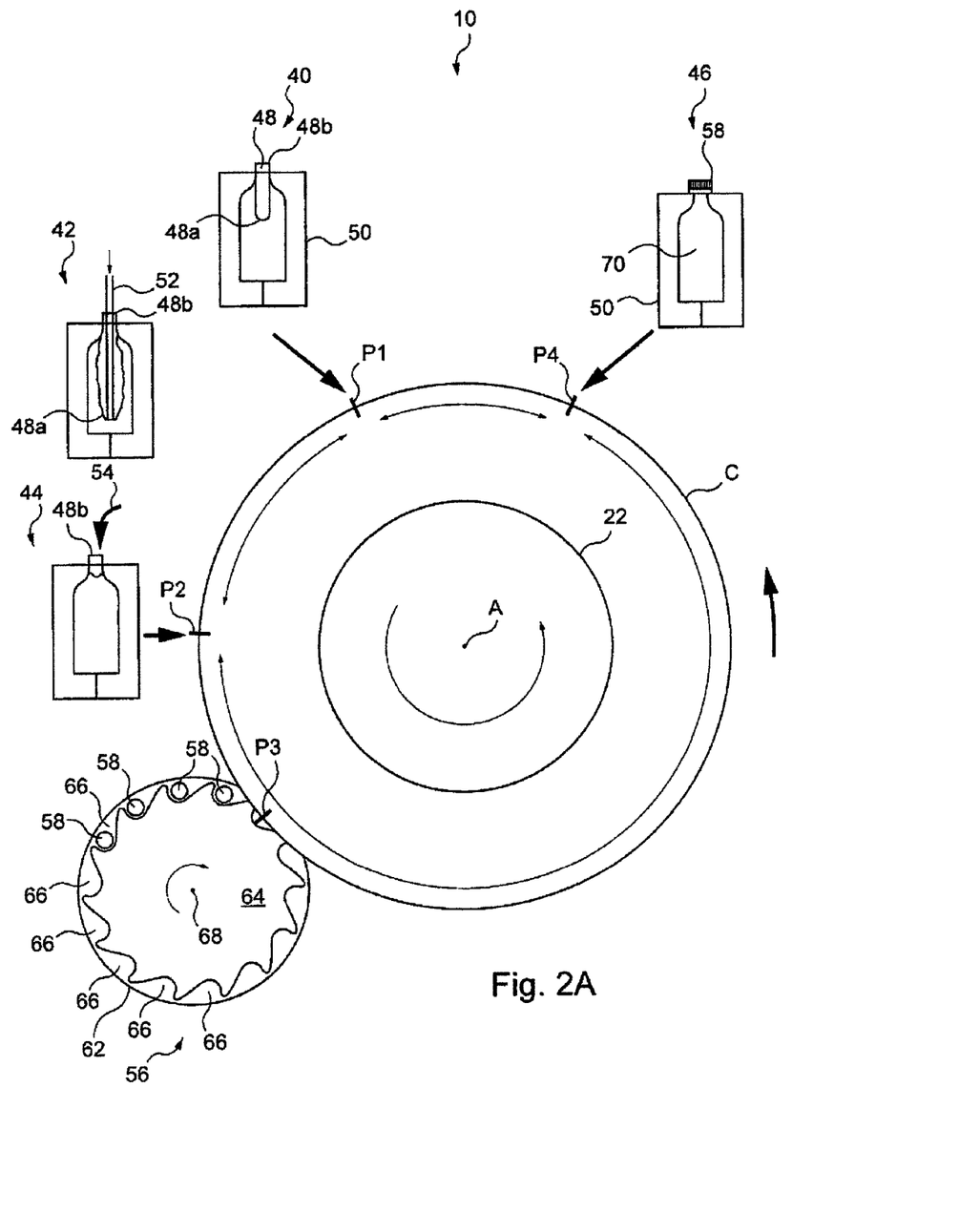
FIG. 2A is a very schematic overview of FIG. 1 system illustrating the whole blowing, filling and capping cycle.
Figure 2B:
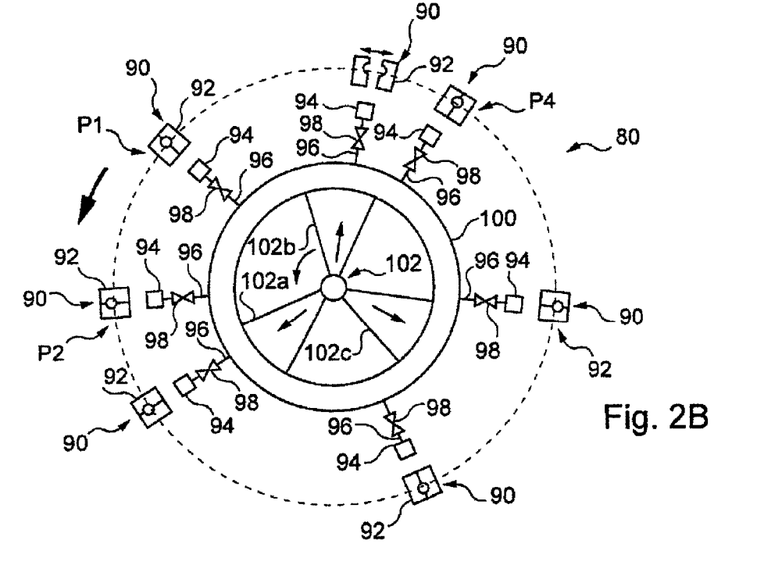
FIG. 2B is a schematic top view of the system of FIG. 2A representing a plurality of peripheral stations around a central manifold of the system.

FIG. 2A is a schematic partial view of the system 10 according to the invention and showing the different operations performed at each station during a whole manufacturing cycle of a container.

This cycle includes blowing, filling and capping phases.

During the whole manufacturing cycle each station is subject to the above-described phases.

As represented in FIG. 2A, manifold 22 of system 10 is very schematically represented in the central position and different stages of the manufacturing cycle are schematically represented at the periphery of manifold 22 and indicated by references 40, 42, 44 and 46.

Stage indicated by reference 40 represents a preform 48 positioned or enclosed within a mould 50 according to a known manner. Plastic preform 48 has been firstly manufactured through a known moulding process and then heated before been positioned within mould 50.

The preform usually assumes the shape of a cylindrical tube closed at its bottom end 48a and open at its opposite upper end 48b.

Once preform 48 has been positioned within mould 50 only the open end 48b of the preform is visible from above the mould.

Stage 40 of the process takes place at a station that is represented by position P1.

Position P1 is disposed on a circle C which schematically represents the peripheral line or circumference on which the different stations of the system are spatially arranged around the periphery of manifold 22.

Stage 42 illustrates a stage or step of the process which makes use of a stretch rod 52. Stretch rod 52 is actuated to be downwardly engaged into open end 48b of the preform so as to come into contact with the closed bottom end 48a thereof.

As represented at stage 42, stretch rod 52 is then further actuated to push the closed end 48a downwardly and stretch the preform accordingly in a controlled manner.

At stage 42 the stretching process is in progress.

After the stretching phase has been initiated liquid is injected into the preform through its open end 48b, while the stretch rod is still being actuated.

This liquid injection causes expansion of the preform together with the movement of the stretch rod until coming into contact with the inner walls of the cavity of the mould, thereby achieving the final shape of the container.

Injection of liquid is schematically represented at next stage 44 by arrow 54.

A position denoted P2 illustrates the position occupied by a station in which the blowing and filling process is achieved. At position P2, the container in each station has been blown and filled with liquid.

The blowing and filling process takes place between position P1 and position P2 along the peripheral line C.

The different stations which are arranged between position P1 and P2 undergo the blowing and filling process which has been described above.

The different stations of the system which are distributed along peripheral line C between position P2 and P3 (second working zone; the first working zone being situated between P1 and P2) are submitted to a capping process.

A cap distributing unit or cap distributor 56 is laterally offset with respect to the plurality of stations disposed along peripheral line C and is more particularly tangent to peripheral line C.

Cap distributor 56 includes a plurality of caps 58 which are disposed at the periphery thereof and spaced from each other.

More particularly, cap distributor 56 takes the shape of a rotating device comprising a circular support 60 viewed from the above this support a substantially cylindrical shape in 3D).

Cap distributor 56 further comprises a plurality of housings which are regularly spatially arranged around the periphery of support 62 in a manner which may be different from that illustrated in FIG. 2A.

As schematically represented in FIG. 2A, cap distributor 56 further comprises a central element 64 which accommodates the plurality of caps 58 thanks to a plurality of recesses or housings 66 disposed at its periphery.

More particularly, the peripheral zone of central element 64 may be scalloped so as to be formed by a succession of protuberances and cavities in which the caps are housed.

Central element 64 is fixed on support 62.

In this embodiment, the whole cap distributor rotates around its central axis 68.

However, in an alternative embodiment, only the central element 64 may be rotatable whereas support 62 remains in a fixed position.

Thus, the successive caps 58 are successively distributed to the different stations passing by cap distributor during rotation of system 10.

Although not represented in FIG. 2A, means for supplying caps to cap distributor 56 are provided in this embodiment in order to load cap distributor 56 with new caps.

The caps 58 which have been distributed to each station passing by cap distributor 56 are then positioned above and around the necks of the containers respectively and capped thereon in a conventional manner. For the sake of clarity conventional capping means are not represented in the drawings.

For instance, the caps are screwed around the threaded neck of each container.

This capping process takes place between the position P3 on peripheral line C that is located vis-à-vis cap distributor 56 and position P4.

At position P4, cap 58 has been fixed on the dispensing opening of container 70 (here, the container is a bottle). This position corresponds to a stage 46 of the process.

Positions P1 and P4 straddle a third working zone in which the moulds of the different stations enclosing a capped and filled container are opened so that the container can be removed before welcoming a new preform at position P1 (stage 40).

It is to be noted that when the apparatus rotates liquid is supplied to manifold 22 through pump device 30 and to the different fluid lines or pipes connected thereto. The different valves 26 may isolate the part of the lines connected to the injection means from the manifold upon command. Thus, a central processing unit (not represented) that controls the whole manufacturing cycle (in particular, the simultaneous blowing and filling process) may send control commands to shut off the valves 96 which are not timely concerned with liquid filling and open those which have been previously closed and are now involved in the filling process.

FIG. 2B is a very schematic top view of a system 80 according to a further embodiment of the invention.

System 80 comprises a plurality of stations 90 which each include a mould 92 enclosing a preform or a container according to the stage of the manufacturing process (blowing, filling and capping).

Each station further includes stretching means for stretching the preform enclosed within the mould. Such stretching means are not represented in FIG. 2B for the sake of clarity.

Each station includes injection means referred to as 94 that is connected through a fluid line 96 incorporating a flow valve 98 to a rotating central manifold 100.

Rotating manifold 100 distributes liquid to each of the above-described station.

Different stations are spatially arranged around the periphery of manifold 100.

Manifold 100 is annular in shape and surrounds a central zone in which a pump device 102 is located. A source of fluid that feeds liquid to pump device 102 is not represented in this drawing.

In the present embodiment, pump device 102 also rotates together with manifold 100 and has suitable fluidic connection therewith.

As represented in FIG. 2B, pump device 102 has several radially extending arms, e.g. three denoted 102a, 102b and 102c which are connected on one end to the pump device and on the other end to an inlet to manifold 100. It is to be noted that several fluid inputs are used instead of a single one in order not to favour a distribution path to a given blowing and filling station.

Liquid is being sent under pressure by pump device 102 to manifold 100 as indicated by the radial arrows. It is more particularly fed to the empty inner space within manifold 100, through a regular spatial arrangement of the inlets and then distributed to the different fluid lines 96 connected to each station. Flow valves 98 act as flow valves 26a, b, . . . n in FIG. 1 and control the flow of liquid from manifold 100 to each injection means according to the stage of the process. For example, valves 98 are commanded to open when the filling stage is being performed.

Only a few stations 90 have been represented in FIG. 2B at different stages of the whole blowing, filling and capping process.

The angular position of each stage represented in FIG. 2A is the same in FIG. 2B.

After position P4, next station illustrates the opening of mould 90 for successively removing and ejecting the blown, filled and capped container and introducing therein a new preform.

System 80 also comprises a cap distributor as in FIG. 2A but which has not been represented here for the sake of clarity.

It is to be noted that this cap distributor does not rotate together with the rotating parts of system 80 but only rotates around its own axis.

However, in a variant embodiment, cap distributor may be part of the rotating apparatus in the system.

Figure 3:
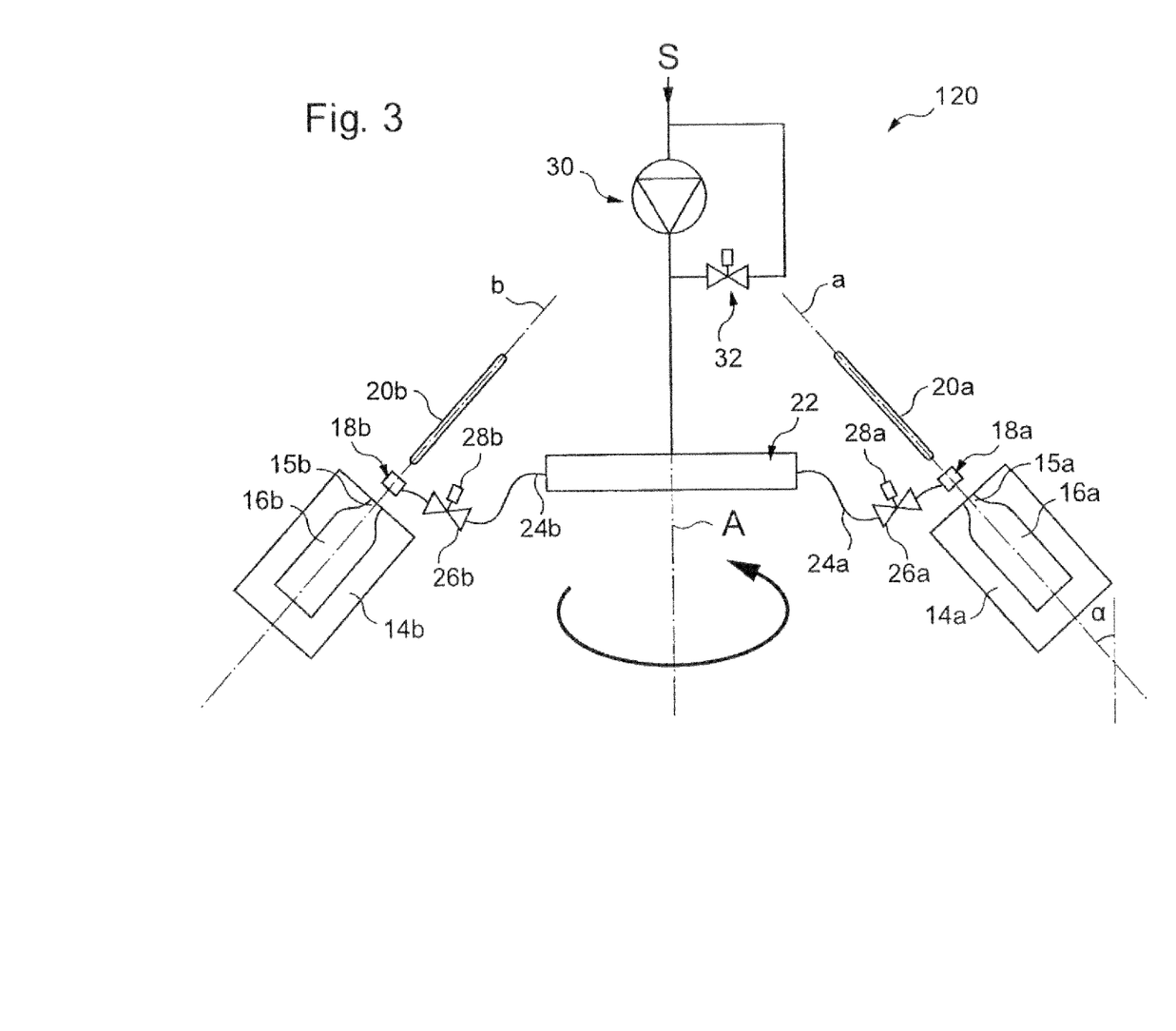
FIG. 3 is another arrangement of FIG. 1 system.

FIG. 3 illustrates another embodiment of a system 120 according to the invention.

System 120 comprises the same components as those illustrated in FIG. 1. Although for each piece of equipment references a and b have been used (e.g. 14*a* and *b*, 26*a* and *b*, etc), it is to be understood that the system also includes references a to n.

For the sake of easiness all the different components of system 120 bear the same references as those of system 10 in FIG. 1.

The different features and advantages set out as regards system 10 are the same for system 120 in FIG. 3 and therefore will not be repeated.

The difference between system 120 and system 10 resides in that the plurality of stations are inclined relative to central vertical axis A around which the whole system rotates, whereas in FIG. 1 the different stations extend each along an axis that is parallel to axis A.

More particularly, in FIG. 3 each mould 14*a*, 14*b* extends in a longitudinal direction that is in alignment with longitudinal axis a, b respectively.

All the other stations not represented in this drawing have the same orientation.

Mould 14*a*, 14*b* has an aperture 15*a*, 15*b* that is provided in the upper portion of the mould.

A preform with a mouth that is not represented in FIG. 3 is to be inserted inside the mould and more particularly through aperture 15*a*, 15*b* so that the preform mouth protrudes from the mould.

Aperture 15*a*, 15*b* is respectively centered around longitudinal axis a, b that is inclined towards central vertical axis A.

More particularly, longitudinal axis a, b is at an angle α relative to the vertical axis that lies between 0° and 90° and that is, for instance, 45°.

This inclination towards central vertical axis A makes it possible to avoid splashing of the liquid all around the container during the rotation of the whole system thanks to centrifugal forces exerted on the liquid in motion.

It is to be noted that the angle of inclination has to be appropriately selected according to the speed of rotation of the system and its diameter. Put it another way, the angle depends on the tangential speed of rotation of the stations.

A system according to the present invention has a capacity of simultaneously blowing and filling a number of plastic containers up to 72,000 per hour.

It is to be noted that the capping process is also included in this high throughput.

The invention claimed is:

1. A system for simultaneously blowing and filling plastic containers from plastic preforms, comprising
   a rotating apparatus including:
   a plurality of molds each being configured to receive and enclose a preform;
   a plurality of stretching members configured to stretch each preform enclosed within a mold from the plurality of molds;
   a plurality of injectors configured to inject a liquid at a pressure into a preform enclosed within a mold from the plurality of molds so as to cause expansion of the preform within a corresponding mold; and
   a manifold coupled to each of the injectors to distribute the liquid under pressure to the plurality of injectors, such that the preforms are simultaneously blown and filled by the liquid, the manifold being centrally located within the system between the plurality of molds, the plurality of stretching members and the plurality of injectors and the manifold being rotatable with the rotating apparatus about a central vertical axis of the rotating apparatus;
   the plurality of molds being spatially arranged around the periphery of the manifold, each mold includes an upper portion provided with an aperture, and wherein each preform having a mouth that is arranged within the aperture when enclosed within the mold, the aperture being centered around a longitudinal axis that is inclined towards the vertical axis; and
   a pump device configured to supply liquid to the manifold at the pressure to cause expansion of the preform and simultaneous blowing and filling of the container.

2. The system of claim 1, wherein the pump device is a part of the rotating apparatus.

3. The system of claim 1, wherein the pump device is in a fixed position.

4. The system of claim 1, wherein the longitudinal axis is at an angle greater than 0° and less than 90° relative to the vertical axis.

5. The system of claim 1, wherein the manifold surrounds a central zone, the pump device being located in the central zone.

6. The system of claim 1, wherein the manifold has an annular shape.

7. The system of claim 6, wherein the manifold is a toroidal shape.

8. The system of claim 1, wherein the manifold has a cylindrical shape.

9. The system of claim 8, wherein the pump device is located above the manifold.

10. The system of claim 8, wherein the pump device is located below the manifold.

11. The system of claim 1, wherein each injector of the plurality of injectors has a proportional valve to control the volume of liquid injected into the corresponding preform.

12. The system of claim 1, wherein one rotation of the apparatus corresponds to a whole blowing and filing cycle of a preform enclosed within each of the plurality of molds.

13. The system of claim 1, wherein the system has a capacity of simultaneously blowing and filling a number of plastic containers up to 72,000 per hour.

14. A system for simultaneously blowing and filling plastic containers from plastic preforms, comprising
   a rotating apparatus including:
   a plurality of molds each being configured to receive and enclose a preform;
   a plurality of stretching members configured to stretch each preform enclosed within a mold from the plurality of molds;
   a plurality of injectors configured to inject a liquid at a pressure into a preform enclosed within a mold from the plurality of molds so as to cause expansion of the preform within a corresponding mold; and
   a manifold coupled to each of the injectors to distribute the liquid under pressure to the plurality of injectors, such that the preforms are simultaneously blown and filled by the liquid, the manifold being rotatable about a central vertical axis, each mold having an upper portion that is provided with an aperture and each preform having a mouth that is arranged within the aperture when enclosed within the mold, the aperture being centered around a longitudinal axis that is inclined towards the vertical axis, the plurality of molds being spatially arranged around the periphery of the manifold; and a pump device configured to supply liquid to the manifold at the pressure to cause expansion of the preform and simultaneous blowing and filling of the container.

15. A system for simultaneously blowing and filling plastic containers from plastic preforms, comprising a rotating apparatus including:

a plurality of molds each being configured to receive and enclose a preform;

a plurality of stretching members configured to stretch each preform enclosed within a mold from the plurality of molds;

a plurality of injectors configured to inject a liquid at a pressure into a preform enclosed within a mold from the plurality of molds so as to cause expansion of the preform within a corresponding mold; and a manifold coupled to each of the injectors to distribute the liquid under pressure to the plurality of injectors, such that the preforms are simultaneously blown and filled by the liquid;

a pump device configured to supply liquid to the manifold at the pressure to cause expansion of the preform and simultaneous blowing and filling of the container; and wherein the apparatus defines a central axis, and a longitudinal axis through an aperture of each mold to receive each preform is inclined relative to the central axis.

* * * * *